United States Patent [19]

Machida et al.

[11] Patent Number: 4,827,795
[45] Date of Patent: May 9, 1989

[54] CONNECTING ROD FOR INTERNAL COMBUSTION ENGINE AND METHOD OF MANUFACTURE

[75] Inventors: Isao Machida; Yasunori Sato, both of Saitama; Yoshiji Yamada, Tochigi, all of Japan

[73] Assignee: Honda Giken Kogyo Kabushiki Kaisha, Tokyo, Japan

[21] Appl. No.: 251,061

[22] Filed: Sep. 27, 1988

Related U.S. Application Data

[63] Continuation of Ser. No. 922,974, Oct. 24, 1986, abandoned.

[30] Foreign Application Priority Data

Oct. 24, 1985 [JP] Japan .......................... 60-162043[U]

[51] Int. Cl.$^4$ ............................................. G05G 1/00
[52] U.S. Cl. ................................. 74/579 E; 74/579 R; 123/137 AB
[58] Field of Search ................... 74/579 E, 579 R; 29/156.5 R; 164/516; 123/197 AB; 92/212, 214, 222, 248, 187

[56] References Cited

U.S. PATENT DOCUMENTS

| | | | |
|---|---|---|---|
| 1,436,074 | 11/1922 | Anderson | 74/579 R |
| 1,559,918 | 11/1925 | Schramm | 74/579 E |
| 1,791,187 | 2/1931 | Brauchler | 74/579 E |
| 1,819,784 | 8/1931 | McKone | 74/579 E |
| 1,831,325 | 11/1931 | Short | 74/579 E |
| 1,836,949 | 12/1931 | Balough | 74/579 E |
| 3,482,468 | 12/1969 | De Biasse | 74/579 E |
| 3,730,020 | 5/1973 | Di Matteo et al. | 74/579 E |
| 4,191,238 | 3/1980 | Pichl | 74/579 E |

FOREIGN PATENT DOCUMENTS

| | | | |
|---|---|---|---|
| 967784 | 5/1975 | Canada | 74/579 R |
| 882948 | 5/1953 | Fed. Rep. of Germany | 74/579 E |
| 1210263 | 2/1966 | Fed. Rep. of Germany | 74/759 E |
| 0173610 | 10/1982 | Japan | 74/579 E |
| 383865 | 11/1932 | United Kingdom | 74/579 E |
| 781953 | 8/1957 | United Kingdom | 74/579 E |

OTHER PUBLICATIONS

Product Engineering, Sep. 1934, p. 327.

Primary Examiner—Richard E. Moore
Assistant Examiner—Vinh Luong
Attorney, Agent, or Firm—Lyon & Lyon

[57] ABSTRACT

A connecting rod having a pair of spaced apart flanges parallel to a plane defined by a crankshaft axis and a piston pin axis. A web connects the flanges to form a rod portion having an I-shaped cross section. The inner surfaces of the flanges include a lateral rounded projection adjacent to the flange edges to improve bending and stress characteristics.

7 Claims, 4 Drawing Sheets

CONNECTING ROD FOR INTERNAL COMBUSTION ENGINE AND METHOD OF MANUFACTURE

This application is a continuation of application Ser. No. 922,974, filed 10-24-86, now abandoned.

BACKGROUND OF THE INVENTION

The field of the present invention is lightweight, highly rigid connecting rods for internal combustion engines and their manufacture.

In recent years, the output power of internal combustion engines has been increased, and connecting rods used in these engines have been designed to be high in strength and rigidity and light in weight as well as practical. Connecting rods are formed by forging methods, casting methods, powder metallurgy methods and the like. The strength and rigidity of the connecting rods have been improved by sintering, nitriding, heat treatment, or the like. At the same time, connecting rods are partly or entirely formed with minimum cross sections in order to reduce weight.

However, in the formation of the connecting rods according to the above methods, there are restrictions in gradients for drawing patterns, sintering density, critical minimum thickness, etc. Therefore, it is difficult to attain desired minimum cross sections and weight.

FIGS. 1 and 2 illustrate one example of a conventional connecting rod or reduced weight. This connecting rod 01 is formed by the investment casting process. The rod 01 is designed to be slender in its entirety. The shoulder portion of the large end portion of the rod 01 is attached with a flange 03A connected with a flange 03 of the rod portion 02. This arrangement is such that the large end portion of the rod 01 exhibits substantial rigidity. However, since the rod portion 02 has an H-shaped section in which a web 04 is in parallel relation with a plane including an axis $L_1$ of the crankshaft and an axis $L_2$ on the piston pin, the rod portion 02 is necessarily thick compared with a rod portion having an I-shaped section with the web perpendicular to the aforementioned plane. Further, the moment of inertia of area of the I-shaped section is the same as that of the rod portion 02. In addition, since a slender side portion of the flange 03 is subjected to large bending moments due to the inertia of rotation, stress concentrations are apt to occur on the side portion.

SUMMARY OF THE INVENTION

The present invention is directed to providing connecting rods for internal combustion engines in which the rod portions are formed with minimum cross section and which exhibit substantial rigidity against bending moments resulting from high speed rotation of an associated crankshaft.

The foregoing can be achieved by manufacturing a connecting rod for an internal combustion engine having a pair of flanges disposed in parallel relation with a plane including the axis of an associated crankshaft and the axis of an associated piston pin. The flanges are connected with each other by a web to form a rod portion having an I-shape in section. The side portions of the pair of flanges are made thick.

DETAILED DESCRIPTION OF THE EMBODIMENTS

Figure 1:
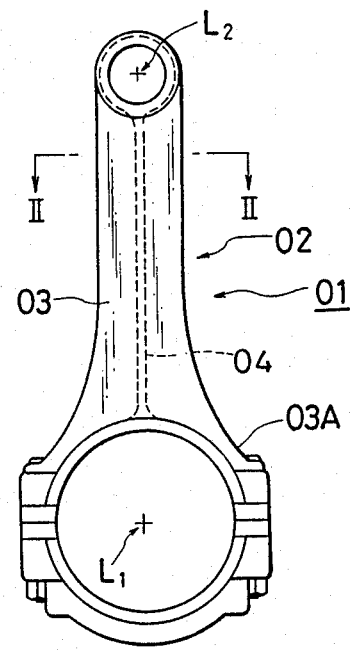
FIG. 1 is a front view of a conventional connecting rod.
Figure 2:
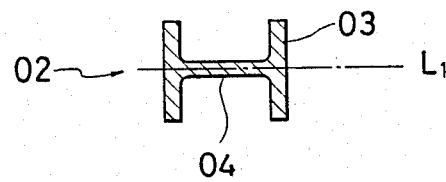
FIG. 2 is a sectional view taken along line II—II of FIG. 1.
Figure 3:
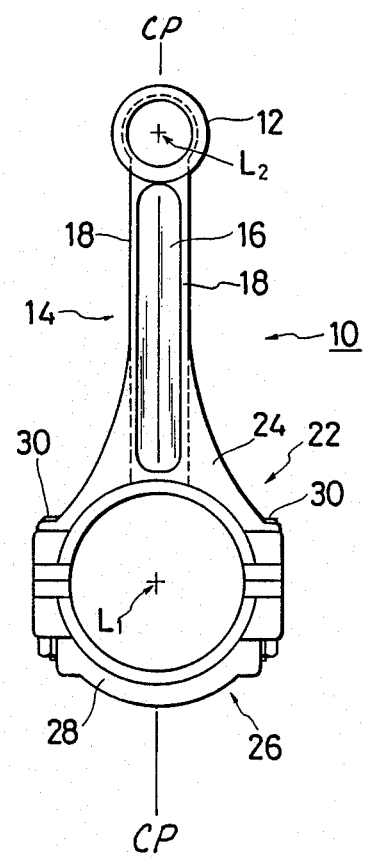
FIG. 3 is a front view of a connecting rod according to one embodiment of the present invention.
Figure 4:
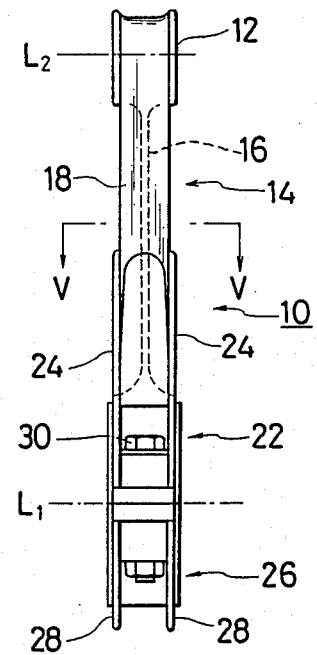
FIG. 4 is a side view thereof.
Figure 5:
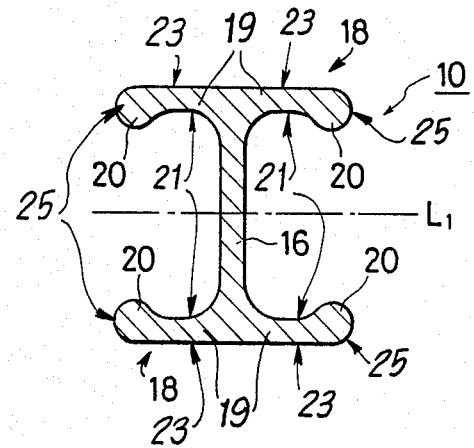
FIG. 5 is a sectional view taken along line V—V of FIG. 4.

FIGS. 3 through 5 illustrate one embodiment of the present invention.

A connecting rod, generally designated 10, comprises a small end portion 12, a rod portion 14, a large end half portion 22, and a bearing cap 26 fixedly secured to the large end half portion 22 by bolts 30, 30. A main body of the connecting rod 10 is made of a cast steel or a cast iron and is manufactured by a casting process which is suitable for casting thin product. A lost wax process may be used which is an investment casting process. The rod portion 14 of the connecting rod 10 has a pair of flanges 18 having inside surfaces 21 and outside surfaces 23 which are held in parallel relation with a plane CP including an axis $L_1$ of a crankshaft and an axis $L_2$ of a piston pin. The flanges 18 are connected with each other by a web perpendicular to the aforementioned plane and the rod portion 14 is formed in an I-shape section providing a large bending rigidity. The body portions 19 of the thin flanges 18 are each formed with a projection 20 at the side edges 21.

From both shoulder portions of the large end half portion 22 to the rod portion 14, a pair of flanges or gussets 24 are formed in parallel relation with the web 16, respectively. The bearing cap 26 is also formed with a pair of flanges 28 held in parallel relation with the web 16.

The rod portion 14 of the connecting rod 10 has a pair of flanges 18 disposed in parallel with the plane including the axis $L_1$ of an associated crankshaft and the axis $L_2$ of an associated piston pin. The flanges 18 are connected with each other by the web 16 perpendicular to the plane containing the axes $L_1$ and $L_2$ to form and I-shape in section. The rod portion 14 has high rigidity and strength against bending moments acting on the rod portion 14 according to rotation of the crankshaft. Thus, the web 16 and the flanges 18 can be made with minimum cross section. In addition, since the flanges 18 are thickened on their facing sides by the projections 20, the moment of inertia of area of the rod portion 14 can be increased. Moreover, since the side portions of the flanges 18 are not concentrated with stress, fatigue strength thereof is greatly improved. Since the projections 20 are formed adjacent to the flange edges 25 on the inner walls (the sides where the flanges 18 are facing each other) of the flanges 18, an investment casting process such as a lost wax process is more suitable to employ in view of pattern drawing. Furthermore, since the large end half portion 22 is provided with a flange 24 and the bearing cap 26 is provided with a flange 28, the portions where the flanges 24 and 28 are provided have high rigidity. Thus, the large end portion is very rigid against bending. In addition, a minimum cross section and reduced weight thereof can be achieved.

Figure 6:
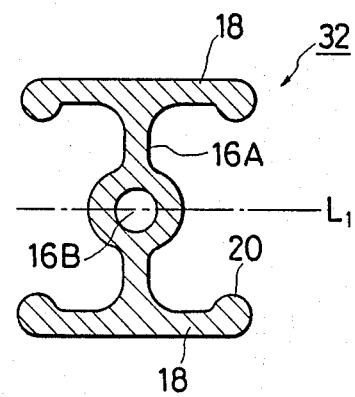
FIG. 6 and FIG. 7 are sectional views of a rod portion of a connecting rod according to modified embodiments of the present invention, respectively.
Figure 7:
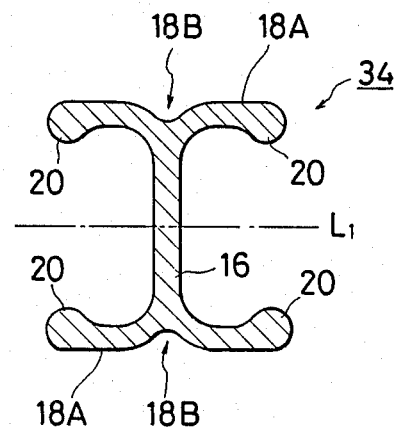

FIGS. 6 and 7 respectively illustrate connecting rods 32 and 34 each having an I-shaped rod portion which is different from that of the connection rod 10.

A web 16A of the connecting rod 32 is formed with a lubricating oil feed path 16B adapted to feed lubricating oil to the small end portion from the large end portion. A sleeve portion defining the lubricating oil path 16B reinforces and stiffens the web 16A. Therefore, the web 16A as well as the flange 18 can be made slender.

The connecting rod 34 includes a shallow groove 18B extending in the elongated direction at the widthwise central portion on an outer surface of the flange 18A where the web 16 is connected with the flange 18A. Generally, in a casting product having two walls connected with each other in the form of T-shape in section, the intersected portion or jointed portion of the two walls is large in thickness which often results in casting defects such as drawing which can cause reduced strength in the casting. By forming the groove 18B at the widthwise central portion of the flange 18a, the thickness of the joint of the web 16 and the flange 18A may be thin, preventing the aforementioned defects.

The connecting rods shown in FIGS. 3 through 7 are made of a steel or cast iron. These connecting rods are formed by an investment casting process such as a lost wax process at a hot melt charging temperature of 1550° to 1650° C. If the temperature is 1550° C. or less, a misrun is produced, and if it exceeds 1660° C., not only the oxidation of the hot melt takes place by heating but also drawing is likely to occur in a cast product. In order to improve the quality of a cast product, it is preferred that casting is performed under reduced pressure at the aforementioned hot melt pouring temperature.

TEST EXAMPLE (1) Connecting rods A, B, C, D, E, and F having the configuration as shown in FIG. 7 were obtained by a lost wax process using an SAE 4340 material of the composition shown in Table 1 under different casting conditions. The casting conditions and the results thereof are shown in Table 2.

Figure 8:
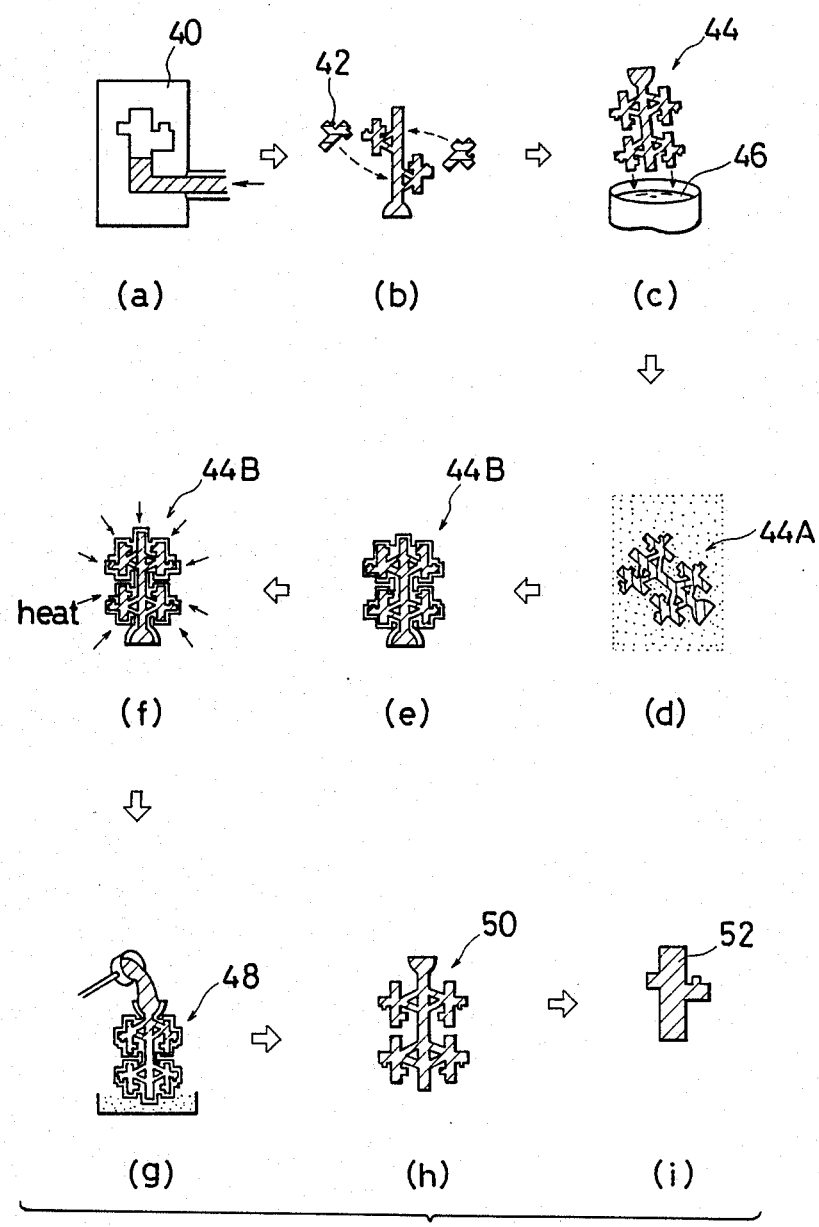
FIG. 8 is an illustration showing each step for obtaining a connecting rod by a lost wax process.

(2) A schematic view of the lost wax process is illustrated in FIG. 8.

Step 1

A petroleum wax was charged into a mold 40 under a high pressure of 35 kg/cm$^2$ and a wax model was obtained (FIG. 8(a)).

Step 2

A plurality of wax models 42 thus obtained were welded to a vertical hot melt inlet port made of wax and a tree was assembled (FIG. 8(b)).

Step 3

The obtained tree 44 was dipped into a refractory slurry 46 comprising a zircon casting mold material (coating material) and an ethylsilicate solvent (binder) and was thereafter taken out (FIG. 8(c)).

Step 4

The tree 44A covered with a slurry was showered with sand (FIG. 8(d)).

Step 5

The tree 44B (FIG. 8(e)) with a coating of about 7 mm in thickness was put into an autoclave, dewaxed for 40 minutes under the conditions of a temperature of 160° C. and a pressure of 6 atm., and then sintered for two hours at a temperature of 900° to 1000° C. (FIG. 8(f)).

Step 6

The shell mold 48 obtained was heated to a temperature of 1000° C., maintained under air pressure or reduced atmospheric pressure (FIG. 8(g)).

Step 7

After a cast product 50 was subjected to sand-falling treatment and cut, it was finished by machining, and a product 52 (corresponding to the connecting rod in the embodiment of the present invention) was obtained (FIG. 8(h), (i)).

TABLE 1

| (Composition of SAE 4349) | | | | | | |
|---|---|---|---|---|---|---|
| C | Si | Mn | Ni | Cr | Mo | Fe |
| 0.36 to 0.43 | 0.15 to 0.35 | 0.60 to 0.90 | 1.60 to 2.0 | 0.6 to 1.0 | 0.15 to 0.30 | Balance |

TABLE 2

| | | (Casting Conditions and Results) | | | |
|---|---|---|---|---|---|
| TEST PIECE | TEMPERATURE | PRESSURE OF CASTING ATMOSPHERE | RUNNING PROPERTY | *4 CASTING DEFECT | CASTING QUALITY |
| A | 1620 | *1 ATMOSPHERIC PRESSURE | *3 O | 0.43% | *3 O |
| B | 1540 | *2 REDUCED PRESSURE | X | — | X |
| C | 1660 | *1 ATMOSPHERIC PRESSURE | O | 1.28 | X |
| D | 1550 | *2 REDUCED PRESSURE | O | 0.08 | ⌀ |
| E | 1545 | *1 ATMOSPHERIC PRESSURE | X | — | X |
| F | 1650 | *2 REDUCED PRESSURE | O | 0.11 | O |

*1: The pressure of the casting atmosphere was atmospheric pressure, since a top pouring method was employed.
*2: The pressure of the casting atmosphere was held in a reduced pressure state, since a vacuum suction type bottom pouring method was employed.
*3: ⌀ denotes an excellent result, O denotes a good result, and X denotes a poor result, respectively.
*4: The casting defect is shown by the percentage of defective portions which occupy a predetermined area. If this percentage is 0.15% or less, it means that the quality of a casting product is excellent, while if it exceeds 1%, the quality thereof is poor.

What is claimed is:

1. A connecting rod for an internal combustion engine having a crankshaft axis and a piston axis said connecting rod comprising:
   a pair of flanges disposed in parallel relation with a plane including the crankshaft axis and the piston pin axis, each flange having a body and edges, each said edge having a lateral rounded projection thereon, such that said edges are thicker than said body; and
   a web connecting said pair of flanges together, said web and flanges thereby forming a rod portion having a generally I-shaped section.

2. A connecting rod according to claim 1, wherein said side edges have inner facing surfaces provided with projections.

3. The connecting rod of claim 2 wherein said projections are curved.

4. A connecting rod according to claim 1, wherein said web is formed with grooves extending in the elongate direction each at outer surfaces of said two flanges in such a manner as to be in alignment with a portion where said web is connected with said two flanges.

5. The connecting rod of claim 1 wherein said web includes a bore.

6. A connecting rod for an internal combustion engine, said connecting rod having a large end half portion engageable to a crankshaft having an axis and a small end portion engageable to a piston pin having an axis comprising:
   a pair of flanges disposed in parallel relation to a crankshaft plane, said crankshaft plane including the crankshaft and piston pin axes,
   each flange having a body and side edges, and each side edge having a lateral rounded projection thereon such that said edges are thicker than said body,
   said pair of flanges connected to each other by a web to form a rod portion having an I-shaped cross-section; and
   a pair of planar gussets disposed on said large end half portion, said gussets oriented in a plane perpendicular to the crankshaft plane.

7. The connecting rod according to claim 6 wherein each lateral projection on said flanges are oriented such that said projections face each other.

* * * * *